United States Patent Office

3,428,585
Patented Feb. 18, 1969

3,428,585
ALIPHATIC GUANAMINE-FORMALDEHYDE
RESINS
Barry Schuller, Florham Park, and August J. Specht,
Madison, N.J., assignors to Allied Chemical Corporation, New York, N.Y., a corporation of New York
No Drawing. Original application Dec. 4, 1963, Ser.
No. 328,110, now Patent No. 3,288,902, dated
Nov. 29, 1966. Divided and this application Oct.
21, 1965, Ser. No. 515,274
U.S. Cl. 260—17.3  2 Claims
Int. Cl. C08g 51/18, 37/24

ABSTRACT OF THE DISCLOSURE

Molding powder consisting essentially of from 63% to 79.4% by weight of an aliphatic guanamine-formaldehyde reaction product, from 0.5–5% of an acid accelerator, from 20% to 30% by weight of cellulosic filler, and from 0.1 to 2% by weight lubricant; molding said powder at 300–400° F., and molding time between 30 seconds and 5 minutes, with controlled correlation between accelerator concentration and molding time to give articles with improved coffee-stain resistance; up to above 35% melamine may be substituted for the guanamine.

---

This application is a division of U.S. application Ser. No. 328,110, filed Dec. 4, 1963, now U.S. Patent 3,288,902.

This invention relates to the molding of thermosetting resins to produce tableware and other articles which are relatively light stable and markedly more resistant to coffee-staining than presently available aminoplast moldings such as the melamine formaldehyde resin moldings.

Aminotriazine-aldehyde resins and particuarly the melamine formaldehyde resins are widely used for resin moldings such as tableware. Such moldings are readily stained by coffee, and the stains cannot be readily removed, as by washing. This drawback of these moldings is probably responsible for the lack of success, to date, to have restaurants and other industrial establishments use aminotriazine aldehyde moldings more extensively.

Notwithstanding that this problem of improving the coffee-stain resistance of such moldings has been the subject of intensive research, the results achieved prior to the present invention leave much to be desired. Suggestions have been made to blend the melamine with benzoguanamine and react the blend with formaldehyde to obtain an aminotriazine aldehyde resin having improved resistance to coffee-staining. While such resins are more resistant to coffee-staining they have the serious objection that they are not light stable, i.e., such resins tend to discolor when exposed to light.

It is a principal object of the present invention to provide a process of molding aminotriazine-aldehyde resins to produce moldings which are light stable and markedly more resistant to coffee-staining than the melamine-formaldehyde resin moldings.

Other objects and advantages of this invention will be apparent from the following description thereof.

In this specification all percentages and parts are given on a weight basis.

In accordance with this invention a markedly improved aminotriazine-aldehyde molding, particularly from the standpoint of its resistance to coffee-staining and light stability is produced by the following combination of important steps:

(1) React an aliphatic mono-, di or triguanamine with formaldehyde in the reactant proportions of from 1.5 to 3 mols of formaldehyde per triazine nucleus in the aliphatic guanamine to form the uncured resin syrup.

(2) When producing an unfilled molding compound dry the resin syrup; when producing a molding compound containing filler, mix the resin syrup with the filler and dry the mixture.

(3) Mix the product from (2) with an acid accelerator or catalyst, solid at room temperature (about 20° C. to 25° C.) or a solid or liquid material forming an acid accelerator under the molding conditions, which material when mixed with the dry resin will not effect curing of the resin, i.e., the resin will remain in the uncured state during the mixing and subsequent storage. The amount of accelerator should be from 0.5% to 5%, preferably 1% to 3%, based on the weight of the mix. The mix can contain from 0% to 40%, preferably 20% to 30% filler, such as alpha cellulose, lubricant, pigment and other additives employed in molding aminotriazine-formaldehyde resins. The mixing of the constituents is conducted to produce a homogeneous blend, i.e., the constituents of the mix are uniformly distributed therethroughout.

(4) Mold this homogeneous mixture at a temperature of 300° F. to 400° F., preferably 300° F. to 350° F., and under any desired molding pressure, usually from 1,500 to 8,000 p.s.i. for from 30 seconds to 5 minutes with controlled correlation between the catalyst concentration in the mixture and the molding time. With relatively low catalyst concentrations the molding time must be longer, i.e., near the upper portion of the 30 seconds to 5 minute range to obtain good coffee-stain resistance. With high catalyst concentrations the molding time is in the lower portion of this time range. Extended cures, i.e., molding times in excess of 5 minutes, have a tendency to result in yellowing of the moldings. Moreover, molding times in excess of 5 minutes and preferably in excess of 3 minutes are undesirable commercially because the longer the molding time the greater the production costs of the moldings.

Moldings produced by the process of this invention have markedly improved coffee-stain resistance, as demonstrated by the test data hereinafter set forth, good light stability, and good resistance to thermal shock and crazing. For example, coffee cups made by the process of this invention boiled in water for one hundred and twenty hours did not crack or craze on cooling, while commercially available melamine formaldehyde coffee cups subjected to the same test cracked.

The aliphatic mono-, di-, or triguanamine employed in the process can be produced by any known procedure. For example, 4-methyl-4-acetyl pimeloguanamine, hereinafter referred to as MAPG, a preferred aliphatic diguanamine, can be produced by reacting methyl ethyl ketone in tertiary butyl alcohol containing a methanol solution of potassium hydroxide with acrylonitrile to form 4-methyl-4-acetyl pimelonitrile. To this product is added cyanoguanidine and a benzyl alcohol solution of potassium hydroxide and the resultant mixture warmed. The reaction is exothermic and soon reaches 130° C. when further heating is unnecessary. The reaction mixture is kept at 140° C. to 160° C. for about two hours and then cooled to precipitate 4-methyl-4-acetyl pimeloguanamine which can be purified by boiling with water, cooling, filtering from hot water and crystallization from benzyl alcohol.

As the production of these aliphatic guanamines is well known (see for example U. S. Patents 2,510,761 entitled Diguanamines, 2,309,679 entitled Process of Preparing Guanamines, and 2,684,366 entitled Preparation of Guanamines), and as any known method can be used and some of these guanamines are commercially available compounds, it is believed further disclosure of the manner of producing the guanamines is unnecessary Exemplary of the aliphatic mono-, di-, and triguanamines which can be employed in the practice of this invention are MAPG, the preferred diguanamine, and the following; the monoguanamines, acetoguanamine and veleroguanamine; the diguanamines, adipoguanamine, succinoguanamine, glutaroguanamine, malanoguanamine, pimeloguanamine, sebacoguanamine, azeloguanamine, suberoguanamine, 4-methyl-4-isopropenyl pimeloguanamine; and the aliphatic triguanamines having the formula:

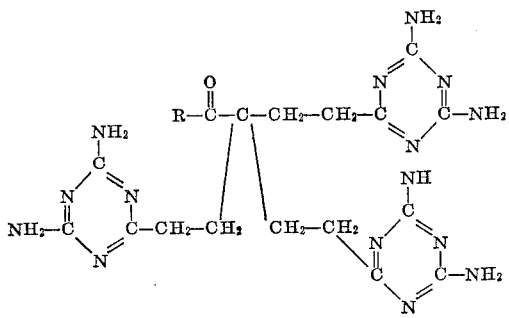

in which R is alkyl containing from 1 to 6 carbon atoms. Mixtures of such aliphatic quanamines can be used if desired.

The formaldehyde is mixed with the aliphatic guanamine in the proportion of from 1.5 to 3 mols of formaldehyde per triazine nucleus in the aliphatic guanamine. Thus in the case of the preferred diguanamines from 3 to 6, preferably 3 to 4, mols of formaldehyde are mixed with each mol of these aliphatic guanamines; in the case of monoguanamines from 1½ to 3 mols of formaldehyde are mixed with each mol of these guanamines; and in the case of the triguanamines from 4.5 to 9 mols of formaldehyde are mixed per mol of triguanamine.

In order to reduce the expense of the amine component of the mixture up to about 35% melamine may be substituted for the aliphatic guanamine, i.e., of the total amount of aliphatic guanamine mixed with the formaldehyde up to 35% thereof can be replaced by melamine without serious sacrifice to the improvement in the desirable properties, particularly the improvement in the resistance to coffee-staining of the molding. From 1.5 to 3 mols of formaldehyde is employed per mol of melamine thus utilized.

In producing the resin, the pH of the aqeous solution of formaldehyde is adjusted to above 7, desirably about 8.1, with alkali, e.g., sodium hydroxide, the aliphatic guanamine mixed with the formaldehyde and the mixture heated to dissolve the guanamine. Heating to about 90° C. in the case of MAPG produces the desired solution. This solution is then refluxed, in the case of MAPG reflux temperature is about 101° C., and held under reflux temperature conditions until a resin having desired viscosity is produced. In the case of MAPG refluxing of the resin reaction mixture is continued until it has a water tolerance of 4 parts water to 1 part of MAPG formaldehyde resin. The resin reaction mixture thus produced is cooled to about 70° C. and its pH adjusted, for example, by addition of sodium hydroxide so that it is above 7, desirably from 8 to 10. It is important that the pH of the resin be at or above 7 when mixed with the fibrous filler. We have found that unless the pH of the resin solution is above 7 before drying of the resin or resin-filler mixture, the resin storage properties suffer.

Subsequent mixing of the dried product is carried out with the acid catalyst either in the solid state or when using a liquid acid forming material under conditions so that the acid forming material does not effect curing of the resin, until the latter is heated strongly, as in the molding process.

The amount of filler employed is within the range of from 0% to 40%, preferably 20% to 30%. The resin-filler-mix is thoroughly mixed to obtain a substantially homogeneous mixture. Optionally, the resin solution can contain added water miscible aliphatic alcohols such as methanol, ethanol, isopropanol, n-butanol, t-butanol to improve mixing operation and aid in keeping the resin in solution. The resultant wet mix is then dried, desirably at a temperature of about 190° F. to 200° F., long enough to produce a dry mix. This dry filler-resin-mix is known in the art as "popcorn." This popcorn is ball milled with desired pigments, accelerators, plasticizers and lubricants to a fine powder. In general, the lubricant, which can be zinc stearate, stearic acid or other known lubricant is added in amount of from 0.1% to 2% of the total mix. The fine powder thus produced usually is densified in conventional equipment for this purpose to reduce its bulk and granulated to form the product ready for molding. The product can be introduced as such into the mold or the form of pellets or preforms.

An important feature of this invention is the amount of catalyst or accelerator incorporated in the mix and the catalyst chosen. The amount should be within the range of from 0.5% to 5% based on the weight of resin when no filler is used and resin plus filler when filler is used. The particular amount chosen within this range will depend on the particular accelerator used and the molding time, which as noted should be within the range of from 30 seconds to 5 minutes. The higher the activity of the accelerator the less thereof used within the recited range of from 0.5% to 5% based on the weight of the mix. Thus, for example, about 1% phthalic anhydride accelerator will give a molding having substantially the same or even better coffee-stain resistance than 2% isophthalic acid; about ½% maleic anhydride will give a molding having substantially the same improved coffee-stain resistance as about 1% phthalic anhydride. Preferred accelerators employed in producing the molding powders, are the organic carboxylic acids, or their anhydrides, solid at room temperature about 20° C. to 25° C.). Examples of such accelerators are isophthalic acid, phthalic acid, phthalic anhydride, terephthalic acid, maleic anhydride, fumaric acid, succinic acid, succinic anhydride, dihydrocinimmic acid, benzoic acid, toluic acid, trimesic acid, citric acid, tartaric acid and pyromellitic dianhydride. Acid generating materials which are liquid at room temperature but nonreactive with the resin during storage and become effective as accelerators under the temperature and pressure conditions employed in the molding can also be used. An example of such liquid acid generating material is the ethyl ester of p-toluene sulfonic acid. Acid generating materials, solid at room temperature such, for example, as the methyl ester of p-toluene sulfonic acid can be used. Inorganic acid forming materials such as zinc sulfate or other acids or acid forming materials which will not cause excessive corrosion of the mold can be used. The aromatic peroxides, such as benzoyl peroxide, do not result in moldings having the desired properties.

The molding mixture is introduced into the mold which can be any conventional mold employed in making tableware or other moldings, and the molding conducted for from 30 seconds to 5 minutes, depending on the catalyst concentration in the molding powder, at a temperature of from 300° F. to 400° F., preferably 300° F. to 350° F., and under any suitable molding pressure, desirably a pressure of from 1,500 to 8,000 p.s.i.; commercial moldings are preferably carried out under a pressure of 4,000 to 5,000 p.s.i. In general, the higher the temperature within this range the shorter the molding time within the range of from 30 seconds to 5 minutes. For optimum performance and for reasons of economy, catalyst concentrations of from about 1% to 3% are used, enabling in the case of the more active accelerators such as a maleic anhydride on phthalic anhydride, the use of molding times of about 2 to 3 minutes or less with the production of moldings having good coffee-stain resistance.

The molding time must be correlated with the catalyst concentration for each catalyst used. Short molding times of the order of 30 seconds can only be used with high concentrations of accelerators, namely, 3% to 5% and then only with the more active accelerators such as maleic anhydride. With the less active accelerators, such for example as isophthalic acid, the amount thereof should be at least 1% and the molding time near about 5 minutes. With increase in the accelerator concentrations the molding time can be reduced to not below 30 seconds. The optimum conditions for each aliphatic guanamine, with respect to the catalyst concentration used for any given catalyst and time of molding can readily be determined by making a few test moldings and comparing the properties, including the coffee-stain resistance, of the test samples.

The following examples are given for illustrative purposes. It will be appreciated the invention is not limited to these examples.

EXAMPLE 1

Preparation of coffee-stain resistant unfilled molding compound 100 parts (1.67 mols) of a 50% aqueous formaldehyde solution was diluted with 50 parts water and 164.7 parts (.476 mols) of MAPG, was added to the formaldehyde solution at a temperature of about 75° C.; the pH at the end of the addition was 7.0±0.2. The solution was refluxed for about 20 minutes and then cooled to ambient temperature. Sodium hydroxide was then added as a 25% aqueous solution to adjust the pH to 9.8±.2.

The solution was evaporated in an oven under a vacuum of 24''; the resin temperature was then 200–210° F. The hot dried resin was then cooled to room temperature, the cooled dried resin broken into chunks and ground in a porcelain ball mill after adding thereto 1.0% phthalic anhydride accelerator and 0.5% zinc stearate lubricant. The resultant fine powder was sieved through a 200 mesh screen.

This molding powder upon molding under a pressure of 4,000 to 5,000 p.s.i. for 3 minutes at a temperature of 325° F. produced an excellent coffee-stain resistant molding having good light stability.

EXAMPLES 2–16

In the case of all the examples which follow the aliphatic guanamine formaldehyde solutions adjusted to a pH of 7 or above, containing 300 parts of resin solids were mixed with 84 parts of α-cellulose and the product was dried at about 200° F.

The dried product was charged to a ball mill with the recited amount of catalyst, and about three parts of zinc stearate lubricant. The mixture was ball milled for about 5 hours. About 0.3 parts of additional zinc stearate was then added and the ball milling continued for an additional hour. The fine powder thus produced was screened through a 40 mesh sieve and cold pressed into tablets.

The molding of these tablets was conducted as follows:

The preformed tablets were preheated and charged to a mold held at constant temperature, indicated in the data which follows. The molding pressure was about 2,500 p.s.i. and the molding time from 30 seconds to 5 minutes. Test moldings in the form of discs were thus obtained.

In testing the moldings thus produced for coffee-stain resistance, the procedure employed involved immersing the test specimens in a coffee preparation prepared by mixing 100 grams instant coffee, 100 grams ground coffee with 1350 ml. of water. Each specimen tested was refluxed with this coffee preparation for 16 hours; the sample was then removed and its percent of whiteness determined employing a Standard Photovolt Model 610 Reflectometer using a green filter.

In the case of a commercial melamine formaldehyde resin the percent whiteness value obtained by this test was 13. This test specimen of the commercial melamine formaldehyde had a color after the coffee-staining test which can be aptly characterized as brown.

In the data given below, the improvement ratio is the percent "whiteness" of the sample subjected to the coffee-stain test divided by the percent "whiteness" of a commercial melamine formaldehyde resin subjected to the same coffee-stain test.

EXAMPLE 2

This example involved MAPG resins made by reacting 3.2 mols of formaldehyde per mol of MAPG. One batch (identified below as 2a) contained 2% isophthalic acid accelerator. A second batch (2b) contained 1% phthalic anhydride accelerator. The molding mixtures from these batches were molded at 300° F., 325° F. and 350° F. for the different time intervals indicated. Table I below gives the coffee-stain resistance of these moldings and for comparative purposes the coffee-stain resistance of a commercial melamine formaldehyde (identified as Control) molding in which the ratio of formaldehyde to melamine was 2.1 to 1 subjected to the same test under the same conditions.

TABLE I

| | Molding Conditions | | Coffee-Stain Resistance Value | Improvement Ratio, percent |
| --- | --- | --- | --- | --- |
| | Temp., °F. | Time, Minutes | | |
| Control | | | 13 | |
| 2a | 300 | 1.5 | 42 | 324 |
| 2a | 300 | 2.0 | 66.5 | 510 |
| 2a | 325 | 1.0 | 67 | 515 |
| 2a | 325 | 2.0 | 71 | 546 |
| 2a | 350 | 0.5 | 63 | 484 |
| 2a | 350 | 1.0 | 72 | 553 |
| 2a | 350 | 2.0 | 73 | 561 |
| 2b | 300 | 1.0 | 49 | 377 |
| 2b | 300 | 1.5 | 64.5 | 496 |
| 2b | 300 | 2.0 | 71 | 546 |
| 2b | 325 | 0.5 | 45 | 346 |
| 2b | 325 | 1.0 | 65 | 500 |
| 2b | 325 | 2.0 | 72 | 553 |
| 2b | 350 | 0.5 | 60 | 461 |
| 2b | 350 | 1.0 | 72 | 553 |
| 2b | 350 | 2.0 | 72 | 553 |

EXAMPLE 3

This example involved the replacement of a portion of the MAPG of Example 2 by melamine. A mixer containing one mol of MAPG and one mol of melamine was reacted with formaldehyde in the proportions of 3 mols of formaldehyde per one mol of each of the MAPG and melamine. The processing was otherwise the same as disclosed above. Two batches were prepared, one (3a) containing 1.25% isophthalic acid accelerator and the other (3b) 1.0% isophthalic acid. These molding mixtures were molded at 300° F., 325° F. and 350° F. for the indicated times. The coffee-stain test results of these moldings are given in Table II which follows.

TABLE II

| | Molding Conditions | | Coffee-Stain Resistance Value | Improvement Ratio, percent |
| --- | --- | --- | --- | --- |
| | Temp., °F. | Time, Minutes | | |
| Control | | | 13 | |
| 3a | 300 | 0.5 | 60 | 461 |
| 3a | 300 | 1.0 | 66.5 | 511 |
| 3a | 300 | 1.5 | 68.5 | 527 |
| 3a | 300 | 2.0 | 72 | 553 |
| 3a | 325 | 0.5 | 64 | 465 |
| 3a | 325 | 1.0 | 71 | 546 |
| 3a | 325 | 2.0 | 72 | 553 |
| 3a | 350 | 0.5 | 71 | 546 |
| 3a | 350 | 1.0 | 72 | 553 |
| 3a | 350 | 2.0 | 72 | 553 |
| 3b | 300 | 0.5 | 47 | 361 |
| 3b | 300 | 1.0 | 48.5 | 373 |
| 3b | 300 | 1.5 | 63.5 | 488 |
| 3b | 300 | 2.0 | 61 | 469 |
| 3b | 325 | 0.5 | 49 | 377 |
| 3b | 325 | 1.0 | 64 | 492 |
| 3b | 325 | 2.0 | 71 | 456 |
| 3b | 350 | 0.5 | 60 | 461 |
| 3b | 350 | 1.0 | 71 | 546 |
| 3b | 350 | 2.0 | 72 | 553 |

EXAMPLES 4–15

The data on these examples is given in Table III which follows. The processing conditions are the same as disclosed above, the accelerator used, the amount thereof, the curing temperatures and times being given in Table III.

TABLE III

| Ex. No. | Resin | Mols | Percent Accelerator | Molding Cond. Temp., °F. | Molding Cond. Time, Min. | Coffee-Stain Resistance Value | Improvement Ratio, Percent |
|---|---|---|---|---|---|---|---|
| 4 | Adipoguanamine / Formaldehyde | 1 / 6 | 1.0 isophthalic acid | 310 / 310 / 325 / 325 | 2 / 5 / 2 / 5 | 64.8 / 72 / 72 / 72 | 498 / 553 / 553 / 553 |
| 5 | Adipoguanamine / Melamine / Formaldehyde | 1 / 1 / 6 | do | 300 / 300 / 325 / 325 | 2 / 5 / 2 / 5 | 59.8 / 65 / 65 / 71 | 460 / 500 / 500 / 546 |
| 6 | Succinoguanamine / Melamine / Formaldehyde | 1 / 1 / 6 | do | 300 / 300 / 325 / 325 | 2 / 5 / 2 / 5 | 73 / 70.8 / 70 / 68 | 561 / 544 / 538 / 523 |
| 7 | Glutaroguanamine / Formaldehyde | 1 / 6 | do | 300 / 300 / 325 / 325 | 2 / 5 / 2 / 5 | 65 / 70 / 70 / 71 | 500 / 538 / 538 / 546 |
| 8 | Malanoguanamine / Formaldehyde | 1 / 6 | 1.0 phthalic anhydride | 300 / 300 / 325 / 325 | 2 / 5 / 2 / 5 | 60 / 68 / 70 / 72 | 461 / 523 / 538 / 553 |
| 9 | Pimeloguanamine / Formaldehyde | 1 / 6 | do | 300 / 300 | 2 / 5 | 71 / 73 | 546 / 561 |
| 10 | Sebacoguanamine / Formaldehyde | 1 / 6 | 0.6 phthalic anhydride | 300 / 300 / 325 / 325 | 2 / 5 / 2 / 5 | 58 / 68 / 71 / 71 | 446 / 523 / 546 / 546 |
| 11 | Azeloguanamine / Formaldehyde | 1 / 6 | 1.0 isophthalic acid | 300 / 300 / 325 / 325 | 2 / 5 / 2 / 5 | 62 / 69 / 70 / 70 | 477 / 531 / 538 / 538 |
| 12 | Suberoguanamine / Formaldehyde | 1 / 6 | do | 300 / 300 / 325 / 325 | 2 / 5 / 2 / 5 | 55 / 60 / 62 / 70 | 423 / 461 / 477 / 538 |
| 13 | 4-methyl-4-isopropenyl pimeloguanamine / Formaldehyde | 1 / 3.2 | do | 300 / 300 / 325 / 325 | 2 / 5 / 2 / 5 | 69 / 72 / 72 / 72 | 531 / 553 / 553 / 553 |
| 14 | Valeroguanamine / Formaldehyde | 1 / 2.2 | do | 300 / 300 / 325 / 325 | 2 / 5 / 2 / 5 | 67 / 71 / 71 / 71 | 515 / 546 / 546 / 546 |
| 15 | Acetoguanamine / Formaldehyde | 1 / 2.2 | do | 310 / 310 / 325 / 325 | 2 / 5 / 2 / 5 | 66.8 / 70 / 70 / 70 | 514 / 538 / 538 / 538 |
| 16 | TEGP [1] / Formaldehyde | 1.0 / 6.6 | do | 300 / 300 / 325 / 325 | 2 / 5 / 2 / 5 | 50 / 65 / 63 / 70 | 385 / 500 / 485 / 538 |

[1] Tris-1 (ethyl 2-guanyl) propanone-2 is an aliphatic triguanamine prepared by reacting tris (2-cyanoethyl) propanone 2-with cyanoguanidine under conditions substantially the same as the described preparation of the other guanamines.

It will be noted that the moldings produced by the process of this invention show a marked improvement in coffee-stain resistance. As compared with melamine-formaldehyde the resistance to coffee-staining has been increasd to an extent which can be characterized as amazing; the percentage improvement as shown by the improvement ratios is from above 300% to well over 500%. Whereas the melamine-formaldehyde moldings subjected to the accelerated coffee-staining test turns a dark brown, the moldings of this invention at most show slight signs of staining; those moldings made under the optimum conditions show a whiteness which is indeed remarkable considering the severity of the test. The moldings of this invention show good light stability. When exposed to sunlight or artificial light for prolonged periods of time, yellowing was slight. In this respect they are a marked improvement over the benzoguanamine formaldehyde and benzoguanamine melamine formaldehyde moldings. They also exhibit good resistance to thermal shock and crazing. Test specimen cups when boiled for one hundred and twenty hours in water did not crack or craze upon cooling, whereas a melamine-formaldehyde cup subjected to the same test cracked. In these respects also the moldings made by the process of this invention are a marked improvement over those made from melamine-formaldehyde resins.

Why the moldings produced by the process of this invention have such surprisingly better resistance to coffee-staining than the heretofore known aminotriazine formaldehyde resins, and particularly the melamine-formaldehyde resins, is not fully understood. One possible explanation, to which, however this invention is not limited, is that the moldings produced by the process of this invention and particularly the preferred MAPG-formaldehyde resin moldings are more resistant to boiling water than melamine-formaldehyde moldings. This is demonstrated by the noted test in boiling water for one hundred and twenty hours. Hence, in the case of the melamine-formaldehyde moldings the surface resin tends to become leached away by repeated contact with hot coffee solutions with consequent irreversible coffee-staining taking place when the surface resin has been removed. Such leaching does not take place or is greatly minimized in the molding produced by the process of this invention. Furthermore, the moldings, i.e., the fully cured resin, produced by the process of this invention, is believed to have fewer coffee-staining sites (—O— and —OH—) because as compared with melamine on a weight basis, the aliphatic guanamines have fewer staining sites. Moreover, under the reaction condition of this invention these sites are more completely reacted and shielded in the fully cured moldings.

The molding powders suitable for producing tableware found to give good light stability and optimum coffee-stain resistance when molded as herein described to obtain a good cure contain from 63% to 79.4% aliphatic guanamine formaldehyde reaction product namely, 4-methyl-4-acetyl pimeloguanamine formaldehyde reaction product, adipoguanamine formaldehyde reaction product, and sebacoguanamine formaldehyde reaction product; from 20% to 30% filler, preferably alpha cellulose, from 0.5% to 5% accelerator, desirably from 1% to 3% of phthalic anhydride, isophthalic acid or maleic anhydride and from 0.1% to 2% lubricant.

Since certain changes in carrying out the above molding process which embody the invention can be made without departing from its scope, it is intended that all matter contained in the above description shall be interpreted as illustrative and not in a limiting sense.

What is claimed is:

1. A molding powder for producing articles resistant to coffee-staining and having good light stability, which powder consists essentially of from 63% to 79.4% by weight of an aliphatic guanamine formaldehyde reaction product selected from the group consisting of 4-methyl-4-acetyl pimeloguanamine formaldehyde reaction product, adipoguanamine formaldehyde reaction product and sebacoguanamine formaldehyde reaction product; from 20% to 30% by weight of cellulosic filler; from 0.1 to 2% by weight of lubricant; and from 0.5% to 5% by weight of acid accelerator, the amount of said accelerator being correlated with a molding time within the range of from about 30 seconds to about 5 minutes so that with concentrations near the lower portion of the accelerator concentration range of from 0.5% to 5% longer curing times within the 30 seconds to 5 minutes range are used and with accelerator concentrations nearer the upper portion of said range of from 0.5% to 5% shorter curing times nearer the lower portion of the 30 seconds to 5 minutes range are used.

2. A molding powder as claimed in claim 1 wherein the acid accelerator is selected from the group consisting of phthalic anhydride, isophthalic acid and maleic anhydride.

References Cited
UNITED STATES PATENTS

| | | | |
|---|---|---|---|
| 2,423,353 | 7/1947 | Thurston | 260—67.6 |
| 2,579,939 | 12/1951 | Lindenfelser et al. | 260—67.6 |
| 2,579,985 | 12/1951 | Varela et al. | 260—17.3 |
| 2,665,260 | 1/1954 | Simons | 260—67.7 |
| 2,781,553 | 2/1957 | Varela et al. | 260—67.6 |
| 3,082,180 | 3/1963 | Boldizar et al. | 260—17.3 |

WILLIAM H. SHORT, *Primary Examiner.*

E. M. WOODBERRY, *Assistant Examiner.*

U.S. Cl. X.R.

260—67.6, 21